United States Patent

[11] 3,625,286

[72] Inventor Patrick N. Parker
    Allen, Tex.
[21] Appl. No. 42,459
[22] Filed June 1, 1970
[45] Patented Dec. 7, 1971
[73] Assignee Atlantic Richfield Company
    New York, N.Y.

[54] WELL-CEMENTING METHOD USING A SPACER COMPOSITION
    6 Claims, No Drawings

[52] U.S. Cl. .................................................... 166/291,
                                                             166/292
[51] Int. Cl. ........................................................ E21b 33/16
[50] Field of Search ............................................. 166/291,
    292, 285; 252/8.55 A, 8.55 B, 8.5 P, 8.5 M, 8.5 C,
                                                             8.5 B

[56] References Cited
    UNITED STATES PATENTS

| | | | |
|---|---|---|---|
| 2,206,389 | 7/1940 | Cannon .......................... | 166/291 X |
| 2,590,814 | 3/1952 | Cardwell et al. ............... | 166/291 X |
| 2,582,909 | 1/1952 | Laurence ...................... | 166/291 |
| 2,848,051 | 8/1958 | Williams ....................... | 166/291 |
| 3,291,211 | 12/1966 | Savins et al. .................. | 166/285 |
| 3,299,952 | 1/1967 | Savins .......................... | 166/285 |

*Primary Examiner*—Stephen J. Novosad
*Attorneys*—Blucher S. Tharp and Roderick W. MacDonald ABSTRACT: A spacer composition for use while cementing a well that contains an oil-base drilling fluid, the spacer containing a water-in-oil emulsion and at least one of an inorganic and organic material such as halides, hydroxides, borates, sulfates, phosphates, organic acids, and the like. A method for emplacing a cementing composition in a well bore containing an oil-base drilling fluid wherein the spacer is the composition of this invention, is employed between the drilling fluid in the well bore and the cementing composition, and is maintained there while the cementing composition is emplaced and hardened in the desired position in the well bore.

WELL-CEMENTING METHOD USING A SPACER COMPOSITION

BACKGROUND OF THE INVENTION

The premise that an organic liquid such as oil is better than water-base materials for drilling fluids is a matter of long standing in the petroleum industry. As an outgrowth of this premise, what is termed in the petroleum industry as "oil-base" drilling fluids (drilling emulsions) and "invert" drilling fluids (drilling emulsions) have been developed.

Oil-base drilling emulsions are those which contain a large amount, e.g., 95 weight percent and higher, of an organic material as the external or continuous phase of the emulsion. The remainder of the emulsion is a minor amount of an aqueous phase which is the internal or discontinuous phase of the emulsion. Thus, oil-base emulsions are water-in-oil emulsions. Of course, such emulsions contain emulsifiers, wetting agents, and other additives which help give the emulsion the desired physical properties for its intended use as a drilling fluid.

The organic base for these oil-base drilling fluids is one which is substantially a hydrocarbon material. Examples of such materials include crude oil, Diesel oil, heavy petroleum refinery liquid residues, asphalt in its normal state, asphalt which has been oxidized by bubbling air therethrough to increase the softening point thereof, lampblack, and the like. This invention applies to any organic base material or materials conventionally used in preparing oil-base drilling fluids.

Those emulsions which are normally termed invert are a species of water-in-oil emulsion which employs organic material similar to those described above but which contains smaller amounts of the organic phase and larger amounts of the aqueous phase.

As with oil-base drilling fluids, this invention applies to conventional invert drilling fluids whatever their organic base may be. Inverts are meant to be included when reference is made herein to the general term oil-base drilling fluid. Thus, the oil-base term in this invention encompasses emulsions which contain a large amount of organic base material as well as inverts.

A full and complete disclosure of oil-base drilling fluids, including inverts, can be found in "Composition and Properties of Oil Well Drilling Fluids" by W. F. Rogers, 3rd Edition, Gulf Publishing Company, Houston, Texas, 1963, starting at page 562.

Thus, oil-base drilling fluids have been used in the past and are presently being used more and more in the drilling of wells, particularly oil and gas wells.

It is a conventional procedure in drilling a well to set a relatively short string of casing in the borehole soon after the start of the drilling operation. This first string of casing is oftentimes referred to as a conductor pipe. The annulus between the outside wall of the conductor pipe and the inside wall of the borehole is filled with a mixture composed primarily of cement and water to fix the casing rigidly in the borehole for subsequent drilling operations. Thereafter, a smaller borehole is drilled below the end of this first casing, and other, smaller diameter strings of casing are set in these smaller diameter boreholes. These other strings of casings can also be cemented in as described above.

When the borehole is drilled with an oil-base drilling fluid a substantial amount of the well bore if not substantially all of the well bore is filled with drilling fluid at the time the casing is emplaced therein.

The cementing composition is then pumped down the interior of the casing to pass out the bottom of the casing and upwardly into the annulus between the casing and the borehole thereby filling this annulus with cement. The cement, after hardening in the annulus, serves to fix the casing rigidly in the borehole.

The problem of obtaining a good cementing job is one of displacing substantially all of the drilling fluid in the annulus with the cement composition. Unfortunately, drilling fluids (particularly oil-base drilling fluids) and oil well cements are not naturally compatible with one another so that when the cementing composition comes into contact with the oil-base drilling fluid the mixture of cement and drilling fluid flocculates or gels to form a material of complex and presently unknown chemical composition but which material is so extremely highly viscous that it becomes substantially unpumpable with conventional pumps and thereby prevents pumping of all of the cement out of the interior of the casing into the annulus. This results in plugging of the interior of the well casing or, at the very least, channeling of the cement in the annulus so that the cement does not form a continuous phase completely around the annulus. Also, this gel can plug the annulus causing a buildup of pressure by the cement composition behind it to a degree sufficient to fracture the formation and pump cement into the formation. This can even plug the oil and gas producing formation of the well. With the cement channeling comes an incomplete and therefore weakened cementing job as well as one which will allow fluid such as drilling fluid to leak away from the borehole being drilled and lost in the incompletely cemented annulus and/or any porous formation adjacent thereto. Also, unwanted water may enter the casing from the formation in the same manner. The ultimate consequence is substantial economic and drilling efficiency loss.

It is extremely important in cementing casing in wells to render the cementing composition and oil-base drilling fluid sufficiently compatible so as to substantially prevent gelation as described above.

SUMMARY OF THE INVENTION

It has now been discovered that the above gelation problems can be overcome by utilizing a particular composition as a spacer to physically separate the oil-base drilling fluid in the well bore from the cementing composition being injected into the well bore without adversely affecting the functioning of either the drilling fluid or the cementing composition.

This invention provides a method for emplacing a cement composition in a well bore containing an oil-base drilling fluid wherein the improvement comprises employing between the drilling fluid in the well bore and the cement composition a spacer material of a composition to be defined hereinafter in detail, and maintaining this spacer between the drilling fluid and cement composition while the cement composition is emplaced in the well and while the cement composition is allowed to harden.

The spacer composition of this invention comprises (1) a water-in-oil emulsion which can be similar in composition to or different in composition from the oil-base drilling fluid in the wellbore, (2) substantially no calcium chloride, and (3) at least one material hereinafter defined in detail.

It is important in order to obtain the desired results of this invention that the spacer contain substantially no calcium chloride and in addition contain at least one of the materials hereinafter defined in an amount effective to substantially prevent gelation of the spacer upon contact with the cementing composition and to prevent premature hardening of the cementing composition.

Accordingly, it is an object of this invention to provide a new and improved well spacer composition. Another object is to provide a new and improved method for emplacing cement in a well bore containing an oil-base drilling fluid. It is another object to provide a new and improved composition and method for preventing gelation of materials from occurring when displacing an oil-base drilling fluid from a well bore with a cementing composition. It is another object to provide a new and improved method and composition for preventing channeling of cementing composition when emplacing same in an annulus between a well casing and the well bore by displacement of an oil-base drilling fluid from the well bore with the cementing composition.

Other aspects, objects, and advantages of this invention will be apparent to those skilled in the art from this disclosure and the appended claims.

DETAILED DESCRIPTION OF THE INVENTION

According to this invention there is provided a method for emplacing conventional well-cementing compositions which are well known to those skilled in the art. These compositions are primarily mixtures of cement and water with or without the addition of accelerators or retarders to speed up or hinder, respectively, the hardening time of the cement.

This method comprises first inserting in the well bore into contact with the oil-base drilling fluid therein the spacer composition of this invention followed by the cement composition. The cement composition is pumped into the well bore under a pressure sufficient to displace drilling fluid and the spacer material upwardly in the annulus between the casing and well bore until substantially all of the cement composition is passed from the interior of the casing into the annulus where it is held until it hardens, the spacer being maintained between the drilling fluid and cement composition during this process of emplacement and while the cement composition is allowed to harden after being emplaced.

Although the normal procedure in cementing casing in a well bore is to pump the cement composition down the interior of the casing and upwards into the annulus, it is possible, and this invention also covers, the emplacement of a cement composition in an annulus by injecting the cement composition into the annulus at the earth's surface thereby displacing drilling fluid in the well bore up the interior of the casing as the cement composition passes downwardly in the annulus.

The well drilling spacer composition of this invention consists essentially of an oil-base emulsion (water-in-oil emulsion wherein the oil or organic base is the external or continuous phase with an aqueous internal or discontinuous phase), certain additional materials hereinafter described, and substantially no calcium chloride.

The organic base for the water-in-oil emulsion of the composition of this invention can be the same as that employed in conventional oil-base drilling fluids and includes all of the materials described hereinabove which are suitable for the organic base of oil-base drilling fluids. This therefore includes any organic base material or materials, particularly hydrocarbonaceous materials, which are conventionally used in preparing oil-base drilling fluids. These water-in-oil emulsions vary widely as to their water content as can be seen from page 564 et seq. of "Composition and Properties of Oil Well Drilling Fluids," supra, but can include from about 1 weight percent to about 75 weight percent aqueous phase while still maintaining the oil as the continuous, external phase of the emulsion.

The water-in-oil emulsions of this invention, as with the oil-base drilling fluids, can contain additional materials such as weighting agents, e.g. barite, lead and iron containing materials, and the like; viscosifiers such as asphalt (if it is not the organic base of the emulsion), bentonite, and the like; surfactants to render the cement that does enter the spacer preferentially oil wet; and emulsifiers in an amount sufficient to prevent the emulsion from "flipping" and reverting to an oil-in-water emulsion, particularly at elevated temperatures. All these additives are conventional and well known in the art. "Composition and Properties of Oil Well Drilling Fluids," supra, page 565 et seq. discloses these additives. For example, suitable emulsifiers include alkali metal soaps or alkaline earth metal soaps or heavy metal soaps, all of tall oil, resin oil, fatty acids, and the like, particularly those water solubilized with ethylene oxide, amines, amides, and the like. The emulsifiers should be soluble in the organic base of the emulsion. Suitable fatty acids are saturated, unsaturated, or mixtures thereof such as capric, isocapric, lauric, tentadecanoic, palmitic, stearic, oleic, linoleic, behenic, tetracosanoic, cerotic, and a fatty acid mixture normally obtained from vegetables or animals, e.g., tall oil, cotton seed, corn, coconut oil, soya, fish oil, animal fat, and the like.

The spacer should contain substantially no calcium chloride although varying minor, ineffectual amounts of calcium chloride can be tolerated so long as gelation or premature hardening does not occur. Generally, no more than about 100,000 parts per million, preferably no more than about 10,000 parts per million, still more preferably no more than about 1,000 parts per million of calcium chloride based on the internal water phase of the emulsion should be present in the spacer.

The spacer should additionally contain at least one material selected from (1) halides, hydroxides, borates, and sulfates of alkali metals; (2) hydroxides, phosphates, phosphites, and borates of alkaline earth metals; (3) metaphosphoric acid or boric acid; (4) lignosulfonates of alkali metals, alkaline earth metals, Cr, Fe, Mn, Co, Ni, Mo, and W; (5) alkyl, cycloalkyl, and aryl carboxylic acids having from one to five, inclusive, carboxylic radicals and two to 30 carbon atoms per molecule, inclusive; (6) acids of group 5 having from one to 10, inclusive, hydroxy substituents; (7) alkenyl and cycloalkenyl acids corresponding to the acids of group 5 and having from one to five, inclusive, double bonds per molecule; (8) anhydrides of the acids of groups 5,6, and 7; (9) carbohydrates; (10) oxides, halides, and carbonates of Zn or Pb; and (11) aldehydes of the acids of groups 5,6, and 7. Although chlorine, bromine, iodine, and fluorine can be employed as the halide, chlorine, bromine, and iodine are preferred.

The alkali metals include lithium, sodium, potassium, rubidium, cesium, and francium, and francium, preferably lithium, sodium, potassium and rubidium. The alkaline earth metals include beryllium, magnesium, calcium, strontium, barium, and radium, preferably magnesium, calcium, strontium, and barium.

The carbohydrates include monosaccharides, e.g., glucose, dextrose, sorbitol, mannitol, and galactitol; oligosaccharides such as disaccharides up to and including hexasaccharides; and polysaccharides such as those having molecular weights from 30,000 to 14,000. Polysaccharides include homopolysaccharides such as starch and cellulose, particularly organosubstituted cellulose such as carboxymethylcellulose, carboxymethylhydroxyethylcellulose, alkali metal and alkaline earth metal salts thereof, and the like. Heteropolysaccharides such as inulin and agar are also included. A full and complete description of these and other suitable carbohydrates can be found in Chemistry of Organic Compounds by C. R. Noller, second edition, W. B. Saunders Company, Philadelphia, 1957, page 359 et seq.

Specific organic acids that are applicable are those of the formula (I)

where $R_2$ is (1)—OM and M is hydrogen, R, alkali metal, alkaline earth metal, Zn, Sn, and Pb or (2) hydrogen; R is (1) alkyl having from one to 20, inclusive, carbon atoms per molecule, (2) cycloalkyl having from three to 20, inclusive, carbon atoms per molecule, (3) aryl having from six to 20, inclusive, carbon atoms per molecule, (4) hydrogen, or (5)

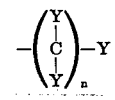

where $n$ varies from zero to 20, inclusive, Y is (a)—COOM (where M is as defined above), (b)—OH, (c) hydrogen, or (d)

The Y's being the same or different in any given molecule; $R_1$ is selected from the same radicals as R and can be the same or different from R in any given molecule.

Other suitable acids are those of the formula (II) 

where M is as defined above; $R_4$ is alkyl, cycloalkyl, or aryl as defined for R above, or hydrogen, or

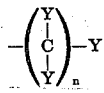

and Y is as defined for R above; and $R_5$ is selected from the same radicals as $R_4$ and can be the same or different from $R_4$ in any given molecule.

An exemplary list, but not an all-inclusive list, of organic acids includes succinic acid, glutaric acid, phthalic acid, maleic acid, tartaric acid, gluconic acid, oxalic acid, citric acid, glucoheptanoic acid, malonic acid, adipic acid, pimelic acid, suberic acid, azelaic acid, and sebacic acid.

The above material should be water-soluble or dispersible in water so that it will dissolve or disperse in the aqueous phase of the water-in-oil emulsion of the composition of this invention. This dissolving and/or dispersing substantially reduces the tendency of the aqueous phase of the emulsion to take up water-soluble or water-dispersible materials from the cement composition. This, in combination with the substantial elimination of calcium chloride, helps prevent gelation and premature hardening of the cement during the above-described cementing process.

The above materials which are added to the spacer are used in widely varying amounts depending upon the composition of the drilling fluid, cement, and spacer emulsion, but generally are used in amounts effective substantially to prevent gelation of the spacer upon contact with the cement composition. The amount used should also be effective substantially to keep the spacer and cement composition pumpable, i.e., to prevent premature hardening of the cement composition. Generally, the material or mixture of materials will be used in amounts substantially up to the saturation point of the aqueous phase of the water-in-oil emulsion and this can amount from about 1,000 to about 500,000 p.p.m. (parts per million parts) of the material or materials based upon that aqueous phase.

The spacers of this invention are prepared by simply mixing the required materials in the desired amounts under ambient conditions of temperature and pressure for a time sufficient to obtain the water-in-oil emulsion itself and to render an intimate mixture of this emulsion with the material or materials added thereto. The spacer can then be emplaced in the well bore on top of the drilling fluid present therein followed by emplacement of the cement composition on top of the spacer. The amount of spacer employed in the method of this invention is that which is sufficient to keep the drilling fluid in the well bore physically separated from the cement composition and will generally be at least about 10 barrels of spacer, the maximum amount of spacer used being dictated only by economic considerations and/or well conditions.

EXAMPLE

A standard American Petroleum Institute thickening-time test was employed to determine how long it would take for the composition being tested to thicken to the point at which it would be relatively unpumpable. The cement compositions tested would have had their own specially designed thickening time and any shortening of this thickening time would cause at least part of the cement composition to harden while still in the interior of the casing and before substantially all of the cement composition had been emplaced in the annulus. Therefore, any shortening of thickening time is unacceptable from a well-cementing point of view. In the alternative, the same or a lengthened thickening time would be acceptable from a well-cementing point of view.

The thickening-time tests were made according to a standard American Petroleum Institute test as published in API publication RP10B, schedule 10 of section 10, 15th Edition, Jan. 1967, and the results of these tests are reported in hours and minutes.

Two different cement compositions were employed. Cement-composition-1 was a Class E cement which is fully and completely disclosed as to composition and properties in American Petroleum Institute Publication RP10A, 13th Edition, Jan. 1967, entitled "Oil Well Cements and Cement Additives," the cement also containing 35 weight percent silica sand, 1.0 weight percent of a 50/50 weight mixture of calcium lignoslufonate/sodium gluconate as a thickening-time retarder, and 42 weight percent water.

Cement-composition-2 was a class H cement which is also described in API publication RP10A, supra, having mixed therewith 35 weight percent silica sand, 0.75 weight percent naphthalene sulfonate, and 1.5 weight percent of a 50/50 weight mixture of calcium lignosulfonate/sodium gluconate as a thickening-time retarder.

The thickening-time retarder used in both cement compositions are conveniently used in well-cementing compositions.

In the first set of tests cement-composition-1 was tested by itself; in a 75/25 weight percent mixture of cement-composition-1/noninvention spacer-1; and in a 75/25 weight percent mixture of cement-composition-1/invention-spacer-1.

The noninvention-spacer-1 was composed of 0.72 barrels Diesel oil, 0.03 barrels water (USA Petroleum Barrels containing 42 USA gallons), 4 pounds of ammoniated attapulgite, 3 pounds of lecithin, and 600 pounds of barium sulfate.

The invention-spacer-1 contained 0.72 barrels of Diesel oil, 0.03 barrels of water, 4 pounds of ammoniated attapulgite, 3 pounds lecithin, 600 pounds barium sulfate, 20 pounds of sodium borax, and contained no calcium chloride. Results of the tests were as follows:

Table 1

| Composition | Thickening Time (Hrs.: Minutes) |
|---|---|
| Cement-composition-1 | 4:40 |
| 75/25 Cement-Composition-1/noninvention spacer | 2:15* |
| 75/25 Cement-Composition-1/invention spacer | 4:50 |

*no gelation, but thickening time shortened so that the cement would harden before emplaced in the annulus.

The second set of tests used cement-composition-2 and a spacer composition which contained a substantial amount of calcium chloride. This spacer composition was noninvention-spacer-2. Noninvention-spacer-2 contained 0.55 barrels Diesel oil, 0.087 barrels water, 20 pounds of calcium tall oil emulsifier, 13.5 pounds asphalt, 10 pounds sulfonated asphalt, 1.3 pounds ammoniated attapulgite, 22 pounds calcium chloride (300,000 parts per million based on the aqueous phase of the emulsion), and 520 pounds barium sulfate.

The second invention spacer composition employed in this second set of tests was invention-spacer-2 and had the same composition as the above noninvention-spacer-2 except that there was no calcium chloride therein and in place of the calcium chloride was sodium chloride in an amount of 370,000 parts per million based upon the aqueous phase of the emulsion used. In the tests where noninvention-spacer-2 and invention-spacer-2 were used a 75/25 weight ratio of cement-composition-2 to the particular spacer was employed. The results were as follows:

Table 2

| Composition | Thickening Time (Hrs.:Minutes) |
|---|---|

| | |
|---|---|
| Cement-composition-2 75/25 of Cement-Composition-2/noninvention-spacer-2 | +6:00* |
| | 2:57** |
| 75/25 Weight Ratio of Cement-Composition-2/invention-spacer 2 | +6:00* |

*test terminated at 6 hours with cement not yet thickened so as to be unpumpable. Therefore, the cement could be emplaced in the annulus without fear of hardening in the casing before reaching the annulus in both cases.

**gelation occurred.

It can be seen from the above tables that the presence of calcium chloride causes gelation and/or shortens the thickening time of the cement so that it could not be emplaced in the annulus before it hardened and that the use of sodium chloride or borax in the absence of calcium chloride makes an effective spacer composition which does not shorten the time for hardening of the cement composition and therefore provides an effective barrier between an oil-base drilling fluid and a cement composition.

Reasonable variations and modifications are possible within the scope of this disclosure without departing from the spirit and scope of this invention.

The embodiments of the invention in which an exclusive property or privilege is claimed are defined as follows:

1. In a method for emplacing a cement composition in a well bore containing an oil-base drilling fluid, the improvement comprising employing between said drilling fluid in said well bore and said cement composition a spacer consisting essentially of a water-in-oil emulsion and at least one material selected from (1) halides, hydroxides, borates, and sulfates of alkali metals; (2) hydroxides, phosphates, phosphites, and borates of alkaline earth metals; (3) metaphosphoric acid or boric acid; (4) lignosulfonates of alkali metals, alkaline earth metals, Cr, Fe, Mn, Co, Ni, Mo, and W; (5) alkyl, cycloalkyl, and aryl carboxylic acids having from one to five, inclusive, carboxylic radicals and two to 30 carbon atoms per molecule, inclusive; (6) acids of group 5 having from one to 10, inclusive, hydroxy substituents; (7) alkenyl and cycloalkenyl acids corresponding to the acids of group 5 and having from one to five, inclusive, double bonds per molecule; (8) anhydrides of the acids of groups 5, 6, and 7; (9) carbohydrates; (10) oxides, halides, and carbonates of Zn or Pb; and (11) aldehydes of the acids of groups 5, 6, and 7; said material being present in an amount effective substantially to prevent gelation of the spacer upon contact with said cementing composition and to prevent premature hardening of said cementing composition, said spacer containing substantially no calcium chloride, and maintaining said spacer between said drilling fluid and cement composition (a) while emplacing said cement composition in said well and displacing said drilling fluid, and (b) while allowing said cement composition to harden.

2. A method according to claim 1 wherein said material is selected from (1) halides, hydroxides, borates, and sulfates of alkali metals; (2) hydroxides, phosphates, phosphites, and borates of alkaline earth metals; (3) metaphosphoric acid or boric acid; (4) lignosulfonates of alkali metals, alkaline earth metals, Cr, Fe, Mn, Co, Ni, Mo, and W; (5) acids of the formula

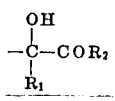

where $R_2$ is (1)—OM and M is hydrogen, R, alkali metal, alkaline earth metal, Zn, Sn, and Pb or (2) hydrogen; R is (1) alkyl having from one to 20, inclusive, carbon atoms per molecule, (2) cycloalkyl having from three to 20, inclusive, carbon atoms per molecule, (3) aryl having from six to 20, inclusive, carbon atoms per molecule, (4) hydrogen, or (5)

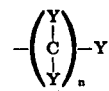

where $n$ varies from zero to 20, inclusive, Y is (a)—COOM (where M is as defined above), (b)—OH, (c) hydrogen, or (d)

$$-\overset{H}{\underset{H}{C}}-OH$$

the Y's being the same or different in any given molecule; $R_1$ is selected from the same radicals as R and is the same or different from R in any given molecule; (6) acids of the formula

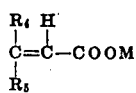

where M is as defined above, $R_4$ is alkyl, cycloalkyl, or aryl as defined for R above, or hydrogen, or

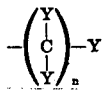

and Y is as defined for R above; and $R_5$ is selected from the same radicals as $R_4$ and can be the same or different from $R_4$ in any given molecule; (7) carbohydrates; (8) acids of group 5 having from one to 10, inclusive, hydroxy substituents; (9) anhydrides of the acids of groups 5, 6, and 8; and (10) oxides, halides, and carbonates of Zn or Pb.

3. A method according to claim 1 wherein said material is selected from (1) halides, hydroxides, borates, and sulfates of alkali metals; (2) hydroxides, phosphates, phosphites, and borates of alkaline earth metals; (3) metaphosphoric acid or boric acid; (4) lignosulfonates of alkali metals, alkaline earth metals, Cr, Fe, Mn, Co, Ni, Mo, and W; (5) carboxymethylcellulose; (6) carboxymethylhydroxyethylcellulose; (7) succinic acid; (8) glutaric acid; (9) sorbitol; (10) phthalic acid; (11) maleic acid; (12) tartaric acid; (13) gluconic acid; (14) oxalic acid; (15) citric acid; (16) glucoheptanoic acid; (17) malonic acid; (18) adipic acid; (19) pimelic acid; (20) suberic acid; (21) azeloic acid; (22) sebacic acid; (23) $ZnCl_2$; (24) ZnO; (25) $ZnCO_3$; and (26) PbO, and said spacer contains no more than about 100,000 p.p.m. $CaCl_2$ based on the water phase of said emulsion.

4. A method according to claim 1 wherein the amount of said material present is from about 1,000 p.p.m. based on the water phase in said emulsion up to about the saturation point of the water phase.

5. A method according to claim 1 wherein said material is one of a borate of groups 1 and 2 or a halide of group 1, and said borate or halide is present in an amount of from about 1,000 to about 500,000 p.p.m. based on the water phase in said emulsion, and said spacer contains no more than about 100,000 p.p.m. $CaCl_2$ based on the water phase in said emulsion.

6. A method according to claim 1 wherein said spacer contains no more than about 1,000 p.p.m. $CaCl_2$.

* * * * *